Patented Nov. 19, 1929

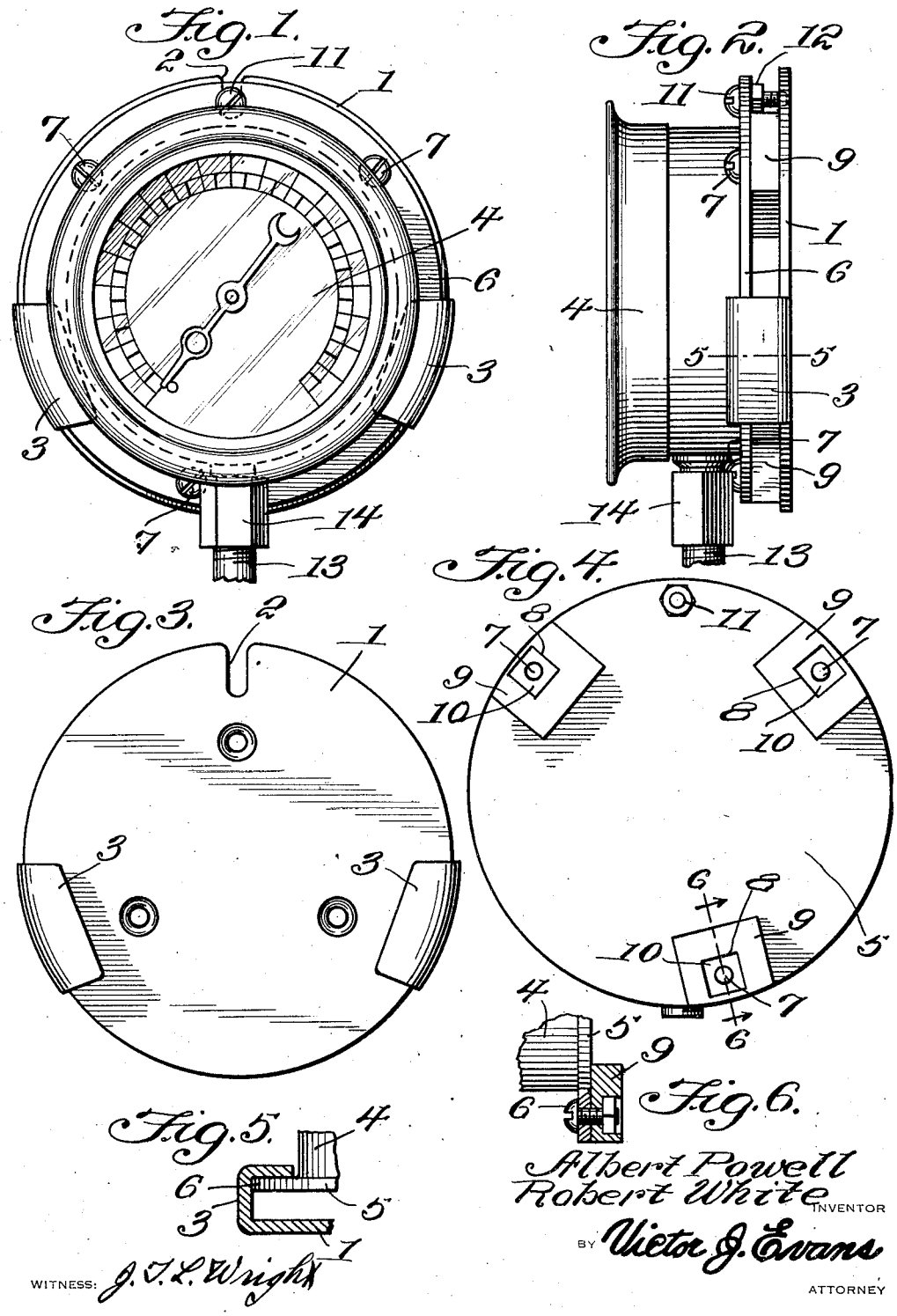

1,736,669

UNITED STATES PATENT OFFICE

ALBERT POWELL AND ROBERT WHITE, OF PENSACOLA, FLORIDA

STEAM-GAUGE HOLDER

Application filed July 1, 1927. Serial No. 202,948.

As is well known steam pressure gauges employed in connection with boilers of locomotives or other steam power plants must be removed and tested at determined spaced intervals to ascertain the correctness of the gauge indicators, and, therefore, the primary object of this invention is the provision of simple but novel means for supporting a steam gauge in a manner that will facilitate the removal thereof when the gauge is to be tested.

A further object is the provision of a gauge support or bracket that affords a wedging engagement with the gauge when arranged therein, which provides means for accurately positioning the gauge on the bracket and in which there are spaced cushioning means between the gauge and bracket in the nature of heat insulator blocks that protect the gauge from excessive heat, and assist in affording the wedging engagement between the gauge and the bracket, the construction being such that the gauge by the employment of a single tool may be disconnected and removed from the bracket.

To the attainment of the above broadly stated objects and others which will appear as the nature of the invention is better understood, the improvement resides in the construction, combination and operative association of parts, a satisfactory embodiment of which is disclosed by the accompanying drawings.

In the drawings:

Figure 1 is a front elevation of a steam pressure gauge supported in accordance with this invention.

Figure 2 is a side elevation thereof.

Figure 3 is a face view of the disc that provides the supporting bracket.

Figure 4 is a rear elevation of the gauge.

Figure 5 is a detail sectional view approximately on the line 5—5 of Figure 2.

Figure 6 is a detail sectional view on the line 6—6 of Figure 4.

In carrying out our invention we rivet or otherwise secure to the boiler or to a suitable support a flat disc 1 that constitutes the bracket of our improvement. The disc in a line with the center is notched in a line with its outer edge, as at 2, and the disc slightly below the center thereof is peripherally formed with inwardly extending clips 3.

The gauge, indicated by the numeral 4, has its back plate 5 projected beyond the body of the gauge proper to form the same with a rim or flange 6. This rim or flange, at preferably equidistantly spaced intervals throughout its circumference has openings therethrough for the reception of short bolts 7 that are received in pockets 8 on the outer faces of combined cushioning, wedging and spacing blocks 9. The blocks are also of heat insulating material, and in the pockets 8 there are the nuts 10 in which the bolts 7 are screwed. Thus it will be noted that neither the bolts nor the nuts project through the pockets.

The rim or flange 6, adjacent to the top of the gauge and in a line with the center thereof, has an opening therethrough, and passed through this opening there is a short bolt 11 that is engaged by a nut 12. The bolt 11 is designed to be received in the notch 2 of the disc or bracket 1. Thus the bolt and the notch 2 provide a guide for properly arranging the gauge on the disc or bracket. The flange or rim 6 will be received in the clip 3 and the blocks 9 will contact with the flat outer face of the disc or bracket 1 to effect both a cushioning and wedging engagement between the gauge and the supporting disc or bracket 1. As stated, the blocks are of heat insulating material and, therefore, prevent the gauge from being affected by excessive heat from the boiler. The steam conductor pipe 13 is connected to the gauge by the usual coupler nut 14. We provide an especially constructed tool in the nature of a flat plate that has a notched or bifurcated end, which latter is designed for screwing or unscrewing the nut 14, while the straightened end of the tool is arranged for contact with the bracket or disc 1 and for wedging the gauge out of engagement with the clips 3, when the gauge is to be removed. The vibration to which the gauge is subjected only serves to bring the same into tighter wedging engagement between the body of the disc or bracket 1 and the clips 3.

Having described the invention, we claim:—

A steam gauge holder in which the rear face of the gauge has fixed thereon three equidistantly spaced blocks of heat insulating material and in which the retaining elements for the securing means are embedded in the blocks and further wherein the back of the gauge in a line with the center and at the top thereof have screwed therethrough a rearwardly depending bolt member, said holder comprising a flat metal disc which has its edges, at equidistant points from its lower center integrally formed with substantially U-shaped clips which are of the same thickness as that of the body of the disc, whose outer faces are designed for frictional contact with the outer face of the back of the gauge, and which disc has a notch entering centrally from its upper periphery to receive the bolt on the back of the gauge therein.

In testimony whereof we affix our signatures.

ALBERT POWELL.
ROBERT WHITE.